United States Patent Office 3,274,262
Patented Sept. 20, 1966

3,274,262
METHOD FOR IMPROVING THE CONVERSION OF AROMATIC CARBOXYLIC ACIDS TO PHENOLS
Denton M. Albright and Charles Perlaky, Penn Hills Township, Allegheny County, Pa., assignors to United States Steel Corporation, a corporation of Delaware
No Drawing. Filed Oct. 23, 1962, Ser. No. 232,595
9 Claims. (Cl. 260—621)

This invention relates to the catalytic conversion of aromatic carboxylic acids to phenols. More particularly, it relates to the use of additives to improve the utilization of an acid by increasing the conversion to a phenolic compound and to inhibit the conversion to undesirable by-products.

A number of workers have studied the catalytic conversion of aromatic carboxylic acids to phenols. Phenolic compounds in good yields have been obtained from aromatic monocarboxylic acids, especially those of the benzene series, in which the carboxyl group is attached to the benzene ring and in which there is at least one unsubstituted position on the ring adjacent the carboxyl group. Other substituents should be substantially inert to oxidation in the presence of a preferred cupric-compound catalyst and may be phenyl, alkyl, alkoxy, nitro and halogen. The conversion reaction may be promoted by a compound chosen from the group containing lithium, sodium, potassium, magnesium, barium and cobalt ions. In one known conversion method the distillate material comprising mainly phenol, carbon dioxide, water and monocarboxylic acid is separated by known means. The state of the art is exemplified by Reissue Patent 24,848, Patents 2,727,926, 2,762,838, 2,852,567, by Kaeding et al., Journal of Industrial and Engineering Chemistry, 53, No. 10 (1961), pages 805–808, and by Toland, Journal of the American Chemical Society, 83 (1961), pages 2507–2512.

Relative to the above, one catalytic conversion method for benzoic acid to phenol has recently achieved commercial status. More particularly, this process involves decomposing benzoic acid at elevated temperature in the presence of small amounts of a cupric benzoate catalyst promoted with magnesium benzoate. To maintain the cupric benzoate catalyst in the active state, oxygen or air is continuously introduced to the reaction mixture. Steam is introduced separately or simultaneously to hasten the decomposition of intermediate reaction products such as phenylbenzoate to yield phenol.

The conversion of benzoic acid to phenol is accompanied by the formation of a tar-like by-product. The formation of such material is undesirable, since valuable benzoic acid and catalyst are lost, and additional processing is needed for the recovery of benzoic acid and catalyst that have become embedded in the tar. The accumulation of tar in the reactor should be avoided; otherwise, the reaction mixture will become so viscous that proper agitation cannot be maintained. Also, a resinous crust will form on the interior walls of the reactor and hinder the maintenance of a uniform reaction temperature. Tar accumulation also causes a rapid decline in the formation and yield of phenol. This probably results from the above-cited effects as well as loss of catalyst particles that become embedded in the tar. These adverse effects may be minimized by periodically withdrawing a portion of the reaction mixture, then solvent-extracting the withdrawn material to recover usable benzoic acid, catalyst and promoter, which may be returned to the reaction vessel, the tar being discarded. In conversions of some other monocarboxylic acids, such by-product tar is formed in quantities greater than in the benzoic acid oxidation.

A method for effectively reducing the amount of tar which is formed would have economic significance, since this would increase the yield of the benzoic-acid reaction. It is an object of the present invention to provide improvements to the method whereby this by-product, tar-formation reaction is inhibited and the rate of the desired reaction is increased with enhanced conversion to phenol.

The above-cited art contains suggestions for lessening the formation of tar. These include the suggestions that the presence of water vapors in the reaction zone reduces the amount of undesirable by-product and tar formation and that the use of magnesium benzoate as a reaction promoter will repress tar formation. Neither of these experiments alone, nor the combination of them, furnishes a solution to the problem of tar formation. Additional improvement in this respect may, however, be obtained by the use of our invention.

Surprisingly, we have discovered that an increased phenol-formation rate and an increased yield result when there is added to the reaction mixture a small, but effective amount of any one of a number of additives that are known antioxidants or oxygen-reaction inhibitors. This discovery is surprising since the conversion of benzoic acid to phenol is an oxygen-dependent reaction. These additives are used commercially to retard the oxidative degradation of materials such as hydrocarbon fuels, resins, and elastomers. Hence, the natural expectation would be that they could not be added without stopping or slowing the desired main reaction. In addition to the increased productivity of the reactor, at a preferred reaction temperature between about 200° and 250° C., other commercial advantages resulting from this invention are that less benzoic acid is consumed as tar and that there is less tar to be processed for the recovery and return of benzoic acid and catalyst to a continuous reaction.

The effect of additive usage on the conversion of benzoic acid to phenol was evaluated using the described experimental apparatus. The reactor was an electrically heated, three-neck, one-liter resin flask, equipped with an electrically driven stirrer and an electrically heated reflux condenser that allowed the removal of phenol. A gas-fired laboratory superheater was used to generate steam, which was mixed with oxygen before its entry into the reactor. The steam-oxygen mixture was admitted by means of a sintered-glass gas-dispersion tube, which was positioned below the surface of the reaction mixture.

A complete understanding of the specific practice of the invention may be obtained from the following specific examples.

EXAMPLES 1–4

To the reactor there were charged 176 g. of benzoic acid, 4.5 g. of cupric acid as a catalyst, and 6.8 g. of magnesium oxide as a promoter. A reaction temperature between about 230° and 240° C. was maintained. Steam and oxygen were introduced at the rates of 0.5 ml./min. and 100 ml./min., respectively, during the reaction. The distillate material, which contained phenol, benzoic acid, and water, was collected for successive one-hour intervals and then analyzed for its phenol content. The reaction was continued for 6 hours, producing 56.0 g. phenol. The rate of phenol production during the last half of this reaction period averaged 9.0 g. phenol per hour.

Example 1 was repeated, as Example 2, except that 176 g. of diphenyl, as a solvent for benzoic acid, were added to the starting mixture. The diphenyl to benzoic acid molar ratio was 1.14.

Example 1 was repeated, as Example 3, except that 1 g. of an anti-oxidant material was added as 4,4'-bis(2,6-di-tert-butylphenol). This is 0.8% by weight of the 122 g. benzoic acid available for reaction to phenol. The remainder of the 176 g. charge of benzoic acid is used to form cupric benzoate catalyst and magnesium benzoate promoter from the cupric and magnesium oxides, respectively, in the original charge.

Example 1 was repeated, as Example 4, except that both 176 g. diphenyl and 1.0 anti-oxidant of Example 3 were added to the starting mixture. The results of these four examples are summarized in Table I.

*Table I.—Effect of additive on the formation rate and yield of phenol from benzoic acid in the presence and absence of solvent*

| Example | Solvent | Additive | Phenol | |
|---|---|---|---|---|
| | | | Yield, g. in 6 hrs. | Rate, g./hr. during last 3 hours |
| 1 | No | No | 56.0 | 9.0 |
| 2 | Yes | No | 51.7 | 6.1 |
| 3 | No | Yes | 70.4 | 11.4 |
| 4 | Yes | Yes | 79.6 | 12.6 |

The results summarized in Table I show that about 0.8 weight percent 4,4'-bis(2,6-di-tert-butylphenol) is an effective additive, either in the absence or the presence of diphenyl. For example, in a six-hour reaction, the use of additive alone, increased the phenol yield from 56 g. to 70.4 g., the phenol formation rate during the second half of the reaction period being increased from 9.0 to 11.4 per hour. The use of additive with diphenyl resulted in a corresponding 79.6 g. yield and a formation rate of 12.6 g. per hour for phenol. This indicates that the additive is more effective when used in conjunction with a suitable reaction solvent. The further benefit obtained by use of the additive together with diphenyl is surprising, since the solvent itself, used without additive, exerts a negative effect on the yield and formation rate of phenol. A blank experiment was conducted, wherein diphenyl together with another additive 4,4'-thiobis(3-methyl-6-tert-butylphenol) and cupric and magnesium benzoates were heated to the reaction temperatures (230° to 240° C.). Oxygen and steam were added as usual. No phenol except that attributable to decomposition of the benzoates was obtained. This indicates that the diphenyl solvent does not cleave to form phenol. This further substantiates our belief that the cooperation between the additive and the diphenyl solvent is an unexpected synergistic result.

EXAMPLES 5–11

Example 4 was repeated, as Example 5, except that the mole ratio of diphenyl to benzoic acid was 1 and that the reaction was continued for 7 hours, producing 82.7 g. phenol. The average rate of phenol generation during the latter half of the reaction was 12.6 g. per hour. Thereafter, the material remaining in the reactor was extracted at 50° C. with five parts of a mixture containing 80 volume percent methanol and 20 volume percent water to separate usable material from tar. The insoluble material remaining in the reactor was then dried at 120° C. for two hours. It weighed 19.0 g. and represented the tar formed in the reaction.

Example 5 was repeated, as Examples 6–10 inclusive, except that a different additive anti-oxidant was used, the concentration thereof in each example being 0.8% by weight of the benzoic acid available for reaction to phenol. For Example 11, Example 5 was repeated, except that no additive was used. Tar determinations were also run in Examples 9 and 11. The results of these seven examples are summarized in Table II.

*Table II.—Effect of additive on the formation rate and yield of phenol and on the amount of by-product tar.*

| Example | Additives | Phenol | | By-Product Tar, g. |
|---|---|---|---|---|
| | | Yield, g. in 7 hrs. | Rate, g./hr. during last 3.5 hrs. | |
| 5 | 4,4'-bis(2,6-di-tert-butylphenol) | 82.7 | 12.6 | 19.0 |
| 6 | 4,4'-methylenebis(6-tert-butyl-o-cresol) | 73.5 | 13.5 | |
| 7 | 4,4'-thiobis(3-methyl-6-tert-butylphenol) | 72.8 | 10.4 | |
| 8 | Tetramethylthiuram disulfide | 70.4 | 9.7 | |
| 9 | N,N'-di-β-naphthyl-p-phenylenediamine | 67.0 | 10.9 | 7.5 |
| 10 | Copper dimethyldithiocarbamate | 60.5 | 9.9 | |
| 11 | None | 56.4 | 6.1 | 40.0 |

The results summarized in Table II show some other antioxidant additives that are effective for increasing the yield and formation rate of phenol, and for significantly decreasing tar formation. For example, use of 4,4'-bis(2,6-di-tert-butylphenol) decreased the amount of tar from 40 g. to 19 g. Similarly, use of N,N'-di-β-naphthyl-p-phenylenediamine resulted in the formation of only 7.5 g. of tar.

While the above examples illustrate preferred methods of operation, other conditions of operation and reagents may be used without departing from the spirit of the invention. The hereinabove described additives have been found effective in the absence of a magnesium benzoate promoter, for example. However, we prefer to use promoters with which our additives are compatible. Our additives are similar in that they are known oxygen-reaction inhibitors used to stabilize materials subjected to high temperatures in either their manufacture or service. The 4,4'-bis(2,6-di-tert-butylphenol), 4,4'-methylenebis(6-tert-butyl-o-cresol) and 4,4'-thiobis(3-methyl-6-tert-butylphenol) are examples of phenolic compounds. N,N-di-β-naphthyl-p-phenylenediamine is an amine-type compound. Tetramethylthiuramdisulfide is an unsubstituted dithiocarbamate and copper dimethyldithiocarbamate a copper-substituted dithiocarbamate. All of the above additives improved reactor productivity. The greatest improvement is obtained with the phenolic-type additives. The minimum effective concentration of an additive may be determined for each reaction and is somewhat less than about 0.8% by weight of monocarboxylic acid available for reaction to phenol. Concentrations of additive greater than about 1% by weight appear to afford no economic advantages justifying greater concentrations. It is obvious that anti-oxidants or oxygen-reaction inhibitors other than the above may be used that have different substituents, positions thereof and ring arrangements or are of a type different from the above, but that are effective for use at our high temperatures. They may be used in amounts effective to enhance phenol production or to reduce tar formation or to do both in improved utilization of a monocarboxylic acid.

In addition to diphenyl as a solvent for a monocarboxylic acid reactant, the above-cited art discloses other solvents such as water, benzene, toluene, xylene, the ester formed in the reaction such as phenyl benzoate and hexachlorobutadiene. Other solvents which may be used are dibenzofuran and dimethylnaphthalene. While a solvent for benzoic acid is not required when using an oxygen-containing gas and steam, it has been found that reaction-stable solvents such as diphenyl improve the reaction when used with our additives. This is so despite the fact that diphenyl in the absence of an additive is detrimental to the conversion of benzonic acid to phenol yet, in combination with an additive, results in the formation of more phenol and less tar. In commercial operation, the synergistic effect of such reaction-stable solvents on our additives must be balanced against the cost of a solvent or its recovery cost for reuse in the reaction. There appears to be no economic justification for using molar ratios greater than about 1 of solvent to acid.

Our invention may be used in the catalytic oxidation to phenolic compounds or aromatic monocarboxylic acids, especially those of the benzene series, in which the carboxyl group is attached to the benzene ring and in which there is at least one unsubstituted position on the ring adjacent the carboxyl group. Other substituents should be substantially inert to oxidation in the presence of a preferred cupric-compound catalyst and may be phenyl, alkyl, alkoxy, nitro and halogen. The conversion reaction may be promoted or accelerated by a soluble magnesium compound. Other promoters may be soluble compounds chosen from the group containing lithium, sodium, potassium, barium and cobalt ions.

The invention is characterized by several distinct advantages that make it possible to convert a monocarboxylic acid to a phenol more efficiently than has been possible heretofore. In the first place, our oxygen-reaction inhibitors accelerate the reaction to a phenol with greater production of phenol from the available acid. Secondly, these inhibitor additives reduce the reaction forming by-product tar. Lastly, reaction-stable solvents for the acid, such as diphenyl, when used with our additives, unexpectedly improve the latter's effectiveness.

Although we have disclosed herein the preferred practice of our invention, we intend to cover as well any change or modification therein which may be made without departing from the spirit and scope of the invention.

We claim:

1. In a catalytic oxidation of a monocarboxlyic acid to a phenolic compound, said acid being one of the benzene series having at least one unsubstituted position on the benzene ring adjacent the carboxyl group, the steps of bringing said acid and a catalyst into contact with oxygen-containing gas, adding to the reaction mixture of said acid, catalyst and oxygen, at least about 0.8% by weight of said acid, of an inhibitor to formation of a tar-like by-product in said catalytic oxidation, said inhibitor being chosen from the group consisting of 4,4'-bis(2,6 - di - tert - butylphenol), 4,4'-methylenebis(6-tert-butyl-o-cresol), 4,4'-thiobis(3-methyl-6-tert-butylphenol), tetramethylthiuram disulfide, N,N'-di-β-naphthyl-p-phenylene-diamine and copper dimethyldithiocarbamate and, recovering a phenolic compound therefrom.

2. A method as defined in claim 1 characterized by said acid being benzoic acid and said phenolic compound being phenol.

3. A method as defined in claim 1 characterized by the addition to the reaction mixture of an effective amount of a promoter chosen from the group consisting of magnesium oxide and magnesium benzoate.

4. A method as defined in claim 1 wherein the monocarboxylic acid is present as a liquid solution in a solvent which is substantially inert under the reaction conditions.

5. A method as defined in claim 4 characterized by said solvent being diphenyl.

6. A method as defined in claim 4 characterized by said solvent and monocarboxylic acid being present in approximately equal molar ratios.

7. A method as defined in claim 1 characterized by the reaction being carried out at a temperature between about 200° and 250° C.

8. A method which comprises passing steam and an oxygen-containing gas through a monocarboxylic acid of the benzene series having at least one unsubstituted position on the benzene ring adjacent the carboxyl group, in contact with a cupric oxide catalyst, adding an amount of an inhibitor to formation of a tar-like by-product in the reaction mixture of at least about 0.8% by weight of said acid, said inhibitor being chosen from the group consisting of 4,4'-bis(2,6-di-tert-butylphenol), 4,4'-methylenebis(6-tert-butyl-o-cresol), 4,4'-thiobis(3 - methyl - 6-tert-butylphenol), tetramethylthiuram disulfide, N,N'-di-β-naphthyl-p-phenylene-diamine and copper dimethyldithiocarbamate and, recovering a phenolic compound therefrom.

9. A method as defined in claim 8 characterized by said acid being benzoic acid and said compound being phenol.

References Cited by the Examiner

UNITED STATES PATENTS 2,727,926  12/1955  Kaeding et al. _____ 260—621

LEON ZITVER, *Primary Examiner.*

HAROLD G. MOORE, *Examiner.*

D. M. HELFER, *Assistant Examiner.*

UNITED STATES PATENT OFFICE
CERTIFICATE OF CORRECTION

Patent No. 3,274,262 September 20, 1966

Denton M. Albright et al.

It is hereby certified that error appears in the above numbered patent requiring correction and that the said Letters Patent should read as corrected below.

Column 2, line 16, for "experiments" read -- expedients --; line 49, strike out "specific"; line 55, for "acid" read -- oxide --; column 5, line 8, for "or" read -- of --.

Signed and sealed this 22nd day of August 1967.

(SEAL)
Attest:

ERNEST W. SWIDER
Attesting Officer

EDWARD J. BRENNER
Commissioner of Patents